United States Patent
Garman et al.

(10) Patent No.: US 10,819,422 B2
(45) Date of Patent: Oct. 27, 2020

(54) LOW POWER RADIO MODEM

(71) Applicants: Christopher James Garman, Morgantown, WV (US); Joshua Myron Kraan, Clarksburg, WV (US)

(72) Inventors: Christopher James Garman, Morgantown, WV (US); Joshua Myron Kraan, Clarksburg, WV (US)

(73) Assignee: Garman Engineering, LLC, Morgantown, WV (US)

( * ) Notice: Subject to any disclaimer, the term of this patent is extended or adjusted under 35 U.S.C. 154(b) by 0 days.

(21) Appl. No.: 16/728,194

(22) Filed: Dec. 27, 2019

(65) Prior Publication Data

US 2020/0213002 A1 Jul. 2, 2020

Related U.S. Application Data

(60) Provisional application No. 62/786,483, filed on Dec. 30, 2018.

(51) Int. Cl.
*H04W 52/02* (2009.01)
*H04B 7/24* (2006.01)
*H04W 72/04* (2009.01)

(52) U.S. Cl.
CPC .......... *H04B 7/24* (2013.01); *H04W 52/0258* (2013.01); *H04W 72/04* (2013.01)

(58) Field of Classification Search
CPC ... H04B 1/38; H04B 5/00; H04B 5/02; H04B 7/24; H04L 1/00; H04L 12/825; H04L 12/835; H04L 29/06; H04W 52/02; H04W 52/06; H04W 52/22; H04W 52/221; H04W 52/223; H04W 52/0258; H04W 68/02; H04W 72/04
USPC .......... 375/219, 222, 295, 316; 455/73, 90.3
See application file for complete search history.

(56) References Cited

U.S. PATENT DOCUMENTS

| | | |
|---|---|---|
| 6,996,399 B2 | 2/2006 | Zinn |
| 2004/0189443 A1 | 9/2004 | Eastburn |
| 2004/0242163 A1* | 12/2004 | Karr ...................... H04H 20/30 455/73 |
| 2005/0226201 A1* | 10/2005 | McMillin ............... H04W 88/04 370/348 |
| 2006/0140208 A1* | 6/2006 | Couch ............... H04W 56/0015 370/445 |
| 2008/0137636 A1* | 6/2008 | Kasslin ................. H04W 88/06 370/346 |
| 2014/0126610 A1 | 5/2014 | Hui et al. |
| 2019/0104480 A1* | 4/2019 | Hasholzner ........... H04W 52/34 |

* cited by examiner

*Primary Examiner* — Shawkat M Ali

(57) ABSTRACT

The present invention comprises a radio frequency modem with a precision timebase that utilizes a novel method of scheduling tasks to minimize average power draw of the system and extend life while running on limited power supplies. Additionally, the invention may optionally utilize the time base required for frequency hopping or spread spectrum communications as the basis for these higher powered tasks.

9 Claims, 3 Drawing Sheets

LOW POWER RADIO MODEM

CROSS REFERENCE TO RELATED APPLICATION

This application claims the benefit of US Provisional Application 62/786,483 filed Dec. 30, 2018.

BACKGROUND OF THE INVENTION

Radio modems are utilized to communicate various forms of data between two or more physical locations by way of wireless radio transmissions. Applications include wireless sensor networks, remote monitoring and control, and battery powered electronic equipment. In cases where limited energy is available, the modem must be configured to operate with the lowest energy consumption possible. Since radio frequency (RF) transmissions consume relatively large amounts of power, devices are typically programmed to stay in a low power receive state. This is done in order to maximize the opportunity to intercept a transmission from another device, in the hopes that the sender may avoid the need to retransmit data, thus wasting precious energy on a duplicate message.

From a system view, it is often very convenient to put devices in a state where they are constantly monitoring the channel for incoming data. However this simple architecture requires each node in the network to remain in a receive state, and continually consume power, as it must constantly be vigilant for incoming data.

Zinn has implemented a receiver which constantly sweeps its intermediate frequency (IF) filter in order to simplify circuitry, however such a system would require the receiver to be constantly searching for incoming data.

Eastburn has devised a system which determines if adequate time is available in a predetermined time slot before attempting to transmit data, however there is no intent or mechanism for the receiver to alter its hop patterns based on internal or externally available data. The system simply seeks to eliminate the need to split data among more time slots than are minimally required.

More sophisticated systems seek to implement a low power (so-called "sleep") mode on each device, which allows an absolute minimum consumption of power for a certain fraction of the time. The drawback of this approach is that receivers must anticipate the time at which a message may arrive so that they may resume operation in a higher power receive state, prior to the time it is anticipated, in order to guarantee receipt of the message. This approach can work with reasonable efficiency in systems which utilize a single channel, as all nodes can simply power up their receiver circuit, and wait for the message to arrive. But in systems which implement multi-channel media (such as frequency hopping, spread spectrum, or mixed media applications) the approach is ineffective. Nodes not only need to know when a message is expected, but also which channel it is expected on. Implementations either require continual scanning of multiple channels, or complex circuitry to observe multiple channels simultaneously. Both approaches have significant impacts on energy consumption.

Many existing systems provide mechanisms to remove frequency slots which consistently contain interfering energy from the hop schedule. For instance, Hui et al. seek to optimize a system of frequency hopping devices by sharing lists of available frequency and time resources, which are then processed to determine a system schedule which contains the fewest number of resource conflicts. This approach, however, requires all devices to participate in the channel negotiations, which severely impacts transmission efficiency and power consumption. Furthermore, such a technique necessarily requires higher usage rates of frequency bands with the lowest amount of interference, which unbalances the distribution of channel resources.

FIELD OF THE INVENTION

The present invention is a wireless radio modem optimized for low power operation and extended run time on limited energy sources. The invention has applications in wireless communications networks which rely on energy supplied by finite sources (i.e. batteries), or sources which may experience intermittent or inefficient conversion of power (such as solar or kinetic energy harvesting). Of particular importance is the implication of extended service life for wireless sensor networks, especially those which may be widely distributed in locations without a wired power source.

SUMMARY OF THE INVENTION

The present invention comprises a radio frequency modem with a precision timebase that utilizes a novel method of scheduling tasks to minimize average power draw of the system and extend life while running on limited power supplies. Additionally, the invention may optionally utilize the time base required for frequency hopping or spread spectrum communications as the basis for these higher powered tasks.

DETAILED DESCRIPTION OF THE INVENTION

The terminology used herein is for the purpose of describing particular embodiments only, and is not intended to limit the scope of the invention. As used herein, the term "and/or" includes any and all combinations of one or more of the associated items. As used herein, the singular forms "a", "an", and "the" are intended to include the plural forms as well as the singular forms, unless the context clearly indicates otherwise. It will also be understood that the terms "comprises" and/or "comprising," when used herein, will be used to specify the presence of stated features, operations, and/or components, but do not preclude nor require the presence of one or more other features, operations, components, and/or groups thereof.

Novel improvements, features, and enhancements to a wireless radio modem are described herein. The present disclosure is provided as an example of the invention, and is not intended to limit the invention to the specific embodiments illustrated by the figures or description provided.

The present invention provides a means of synchronizing nodes within a wireless network, so that they may minimize power consumption by entering a low power ("sleep") state for a maximum amount of time. Furthermore, the invention provides a means to ensure the same benefits of energy conservation apply when multi-channel systems are implemented. The basis of this synchronization occurs through the use of an extremely low powered circuit which may control the entirety of power provided to the radio circuit, according to a rigid, and universal, transmission schedule.

Figure 1:
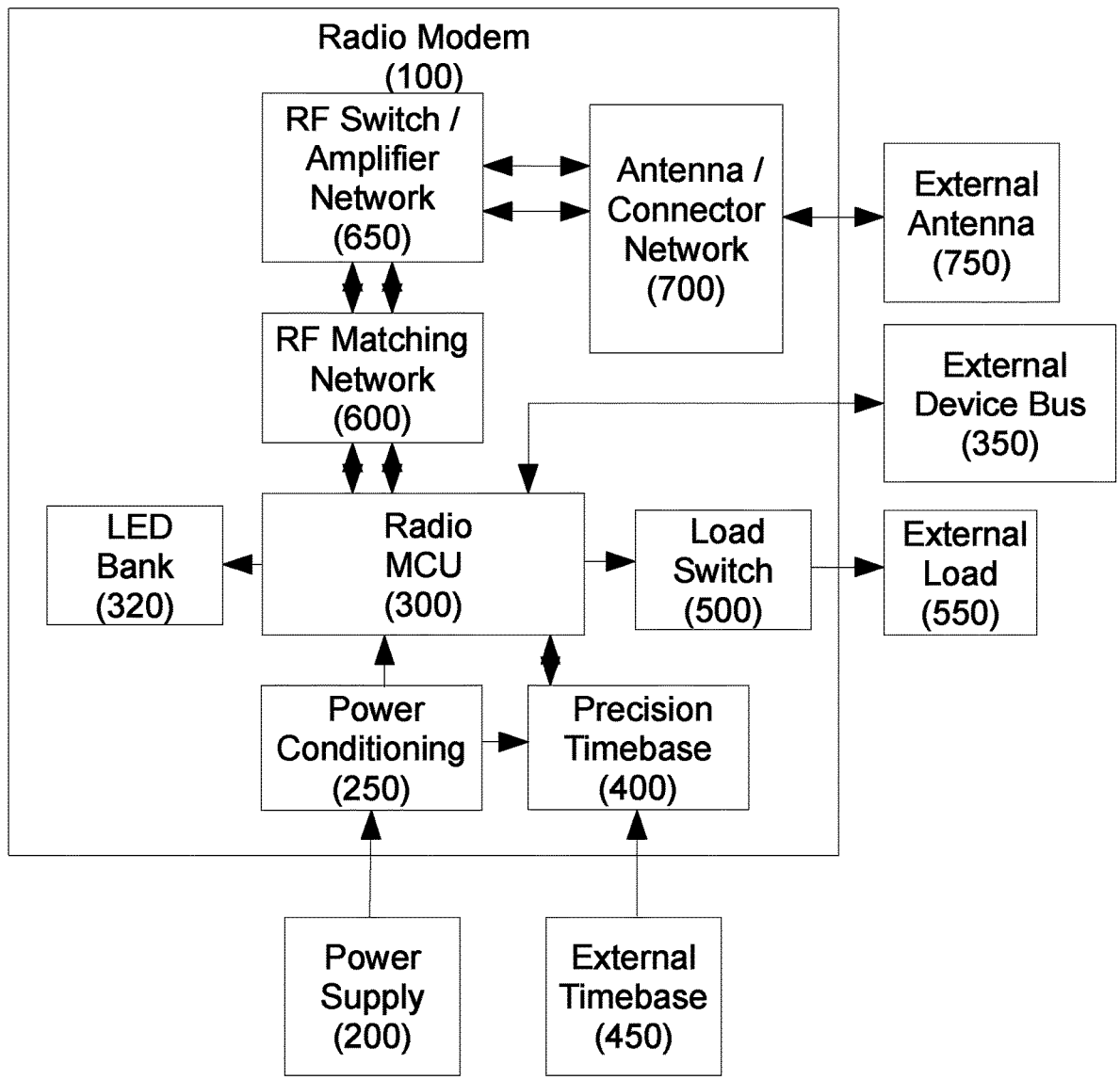
FIG. 1 depicts a system diagram of the device, including subcomponents and external connections.

FIG. 1 depicts a system diagram of the device, showing one embodiment of the invention with connections to various external devices. Alternate embodiments of the invention may comprise other arrangements or configurations of the components, including but not limited to: more, fewer, or various internal subsystems; more, fewer or various external interfaces; and more, fewer, or alternate connections within the device itself.

In the preferred embodiment of the invention, Radio Modem 100 is powered by an external source, Power Supply 200, a power supply such as a battery, solar array, energy harvesting source, or other supply with limited production ability. Power Conditioning circuit 250 may include one or more storage, filtering, or conditioning circuits which allow the remainder of Radio Modem 100 to operate on a limited power supply. In one embodiment, Power Conditioning circuit 250 may include bulk capacitance to account for the short term current requirements of a high power radio transmission by Radio MCU (microcontroller unit) 300, despite the fact that Power Supply 200 may or may not be able to source this current independently. In alternate embodiments, Power Conditioning circuit 250 may include filtering components to ensure reduced electromagnetic interference with other systems.

In an alternate embodiment of the invention, Radio Modem 100 may optionally be connected to a Power Supply 200 such as a line power, rechargeable battery, other sources that do not have limited power production ability.

In the preferred embodiment of the invention, Precision Timebase 400 is a real time clock (RTC) which is synchronized by Radio MCU 300. In alternate embodiments of the invention, Timebase 400 may simply be a low power oscillator, clock, or other synchronization input from external circuitry.

In the preferred embodiment of the invention, Radio Modem 100 contains Light Emitting Diode (LED) Bank 320, which can be configured to signify events and states such as connection strength, message activity, battery level, or any other system information.

In an alternate embodiment of the invention, Precision Timebase 400 may optionally synchronize to External Timebase 450, in order to provide synchronization to other Radio Modems 100 or disparate external systems. External Timebase 450 may be one or more circuits or devices such as a Global Positioning System (GPS) receiver, Pulse per Second (PPS) signals from a GPS receiver, precision quartz or silicon oscillators, miniature or full-size atomic clock references, or other optional systems.

In the preferred embodiment of the invention, Precision Timebase 400 may optionally be used to schedule changes to radio parameters such as frequency, transmission power, data direction, or other parameters, in order to support RF transmission protocols such as time division multiple access (TDMA) channel priorities, frequency hopping (FH) or direct sequence spread spectrum (DSSS) patterns, or other optional protocols.

Through synchronization with other systems via External Timebase 450, Radio Modem 100 may optionally provide increased performance through enhancements such as extended sleep periods, reduced transmission windows, reduced time or frequency errors of transmissions, or other enhanced features.

In the preferred embodiment of the device, Load Switch 500 provides power to External Load 550, which may optionally be high power device or interface that is beyond the load switching capabilities of Radio MCU 300. External Load 550 may be one or more circuits or devices such as high powered sensors, additional power supplies, motors, controllers, or switching or control circuitry further interfacing to additional systems.

In the preferred embodiment of the invention, the power supply of External Load 550 may optionally be separate from Power Supply 200, and function beyond either or both of the voltage or current handling specifications of Radio MCU 300.

In the preferred embodiment of the invention, Radio MCU 300 interfaces with RF Matching Network 600 to provide proper impedance matching for RF Switch/Amplifier Network 650. RF Matching Network 600 may optionally be comprised of active or passive components such as, but not limited to, capacitors, inductors, resistors, filters, transformers, baluns, amplifiers, transmissive or reflective RF switches, or other devices. In alternate embodiments of the invention, RF Matching Network 600 may optionally provide plural RF transmission and reception paths to enable a plurality of various RF frequencies to be transmitted and received simultaneously or in succession.

In the preferred embodiment of the invention, RF Switch/Amplifier Network 650 interfaces with Antenna/Connector Network 700 to provide one or more options for connections to various antennas or other amplification, filtering, or signal transforming devices. In an alternate embodiment of the invention, RF Switch/Amplifier Network 650 may optionally provide interfaces for a plurality of various RF frequencies, protocols, or antenna styles.

In the preferred embodiment of the invention, Antenna/Connector Network 700 includes a connector for External Antenna 750 to be connected directly or via cable to Radio Modem 100. In an alternate embodiment of the invention, Antenna/Connector Network 700 may optionally include one or more antennae such as printed trace antennas, inverted F antennae, negative image antennae, or printed circuit board (PCB) chip scale antennae internally to its functional block.

In the preferred embodiment of the invention, Radio MCU 300 creates an internal schedule of radio network events, including, but not limited to: its own scheduled transmission events, the scheduled transmission events of other network devices, scheduled network messages intended to re-synchronize the network to compensate for individual clock drifts, or scheduled events on External Device Bus 350 that may or may not require radio transmission or reception.

In an alternate embodiment of the invention, the frequency or time of Timebase 400 may be calibrated according to any number of inputs available to Radio MCU 300, including but not limited to temperature, network time, time between network events, time between events on External Device Bus 350, or other available information.

In the preferred embodiment of the invention, Radio MCU 300 may optionally set an alarm on Precision Timebase 400 according to the next scheduled event in the network, which may optionally include its own events. After setting this alarm, Radio MCU 300 may optionally power down internal circuitry or circuitry attached to External Device Bus 350, and then enter a low power state to preserve energy provided by Power Supply 200. When the scheduled alarm occurs, Precision Timebase 400 sends a signal to Radio MCU 300 which responds by returning to a fully-powered state whereupon it may optionally monitor External Bus 350; activate or deactivate Load Switch 500; listen for anticipated radio traffic; or generate a radio message of its own. After tasks requiring a high power state have been addressed, Radio MCU 300 may optionally load a new alarm for a subsequent scheduled event into Precision Timebase 400, return to a low power state, and resume this high/low power cycle for future events.

Figure 2:
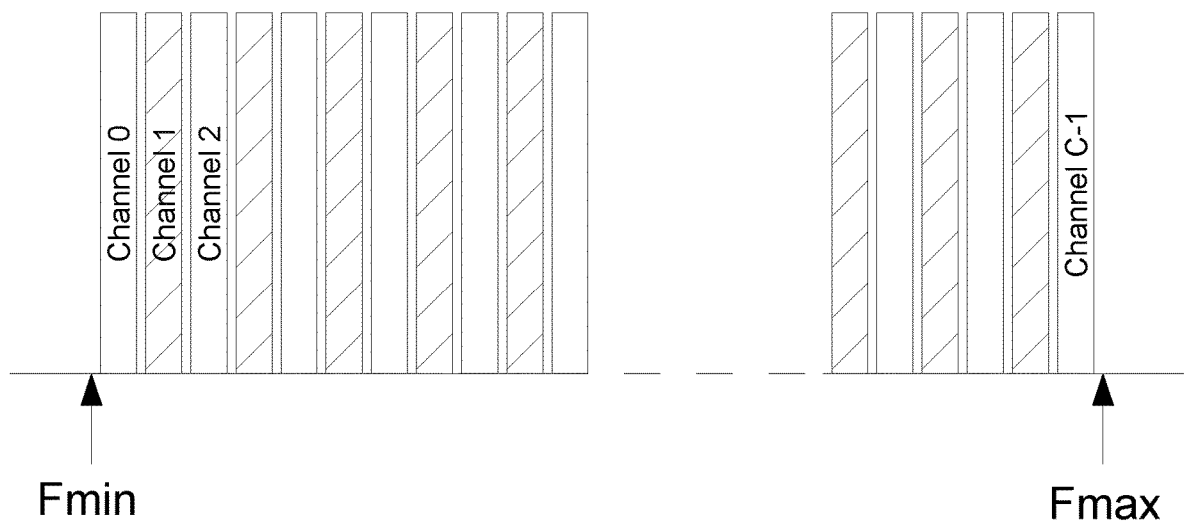
FIG. 2 depicts a frequency allocation diagram of the device, indicating the use of various channel frequencies within a given bandwidth.

FIG. 2 depicts an exemplary radio frequency spectrum in an allocated band between frequencies Fmin and Fmax. Within this band, a quantity of "C" channels identified as Channel "0" through Channel "C−1" may be designated for use by the system at a particular time. In the preferred embodiment of the invention, Radio Modem 100 utilizes each channel in a pseudorandom order according to a predetermined schedule controlled by Time Base 400. In alternate embodiments of the invention, the channel order may be sequential, predetermined, purely random, or any other combination therein.

In a preferred embodiment of the invention, only one of a plurality of Radio Modems 100 transmits information at given time, whereas one or more other Radio Modems 100 within range of the transmitter are able to receive said information concurrently.

Figure 3:
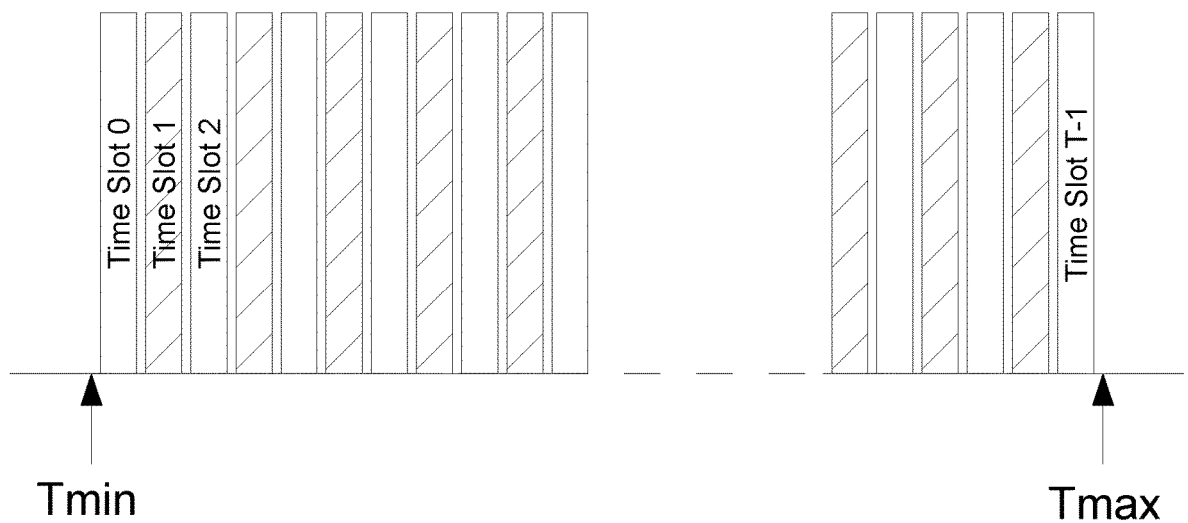
FIG. 3 depicts a time slot allocation diagram of the device, indicating the use of carefully scheduled time slots within a single frequency band in order to avoid RF message collisions.

FIG. 3 depicts an exemplary time slot allocation of an individual frequency channel discussed in FIG. 2. Within the total time allocated to a given channel, up to "T" time slots identified as Time Slot "0" through Time Slot "T−1" are available for communication by one or more Radio Modems 100. This further division of the scheduled changes between "C" channel frequencies allows a total number of scheduled transmission events numbering from 1 to the product of "C" times "T". In this way, one or more Radio Modems 100 may follow identical channel and time slot schedules without the need to sample the channel before asserting a transmission, thereby increasing overall system efficiency and power savings.

In the preferred embodiment of the invention, a plurality of Radio Modems 100 may optionally sample the timing of scheduled RF channels to detect transmissions by other devices, and provide data to each internal Radio MCU 300 for use in determining any timing discrepancies between the system schedule and the time as determined by its internal Precision Timebase 400. A Radio MCU 300 may then optionally calibrate its Precision Timebase 400 in order to realign itself with the schedule, and preserve efficiency of the system.

In an alternate embodiment of the invention, one or more Radio Modems 100 may be configured as a "Master" scheduler for the purpose of controlling the schedules of one or more subgroups of one or more other Radio Modems 100. In this way, one or more subgroups of Radio Modems 100 may simultaneously coexist and operate in one or more RF domains without creating interference among the subgroups.

In the preferred embodiment of the invention, Radio Modem 100 utilizes a FH TDMA communication system where Radio MCU 300 may receive information from External Device Bus 350, External Time Base 450, or a message arriving via Antenna/Connector Network 700 which it then uses to alter or adapt the usage order of either or both frequency and time slot allocations. Such information may optionally include universal date or time data, hopping or encryption keys, or other instructions for external systems. This embodiment provides the ability to synchronize the frequency and time slot allocations of multiple Radio Modems 100 without the need to distribute schedule information over the radio channel. As a result, Radio Modems 100 may conserve energy by drastically reducing the number of messages transmitted over the radio channel in order to synchronize the system.

In an alternate embodiment of the invention, Radio Modem 100 may use such information to deterministically calculate its frequency and time slot assignments without the need to observe the radio activity of the channel, thereby increasing system efficiency, and reducing power consumption. Additionally, Radio Modem 100 may optionally provide increased security by encrypting and/or decrypting such information in order to reorder its assignment of frequency and/or time slots. In such a manner, Radio Modem 100 may optionally provide Low Probability of Detection (LPD) or Low Probability of Interception (LPI) by systems which seek to gain knowledge of data transmitted via the radio channel.

In the preferred embodiment of the invention, Radio MCU 300 may utilize information such as strength of a received radio signal, presence of interfering signals, physical location as reported by GPS data, radio network packet routing data, or any other available data in order to determine or estimate the average signal integrity between two or more Radio Modems 100. In such a manner, each Radio Modem 100 may then provide predictions of its radio transmission performance in a given configuration, so that users may relocate or reposition each Radio Modem 100 or its External Antenna 750 in order to maximize system performance, robustness, and reliability. In alternate embodiments of the invention, this information is provided to users locally via LED Bank 320, or to users both remotely and locally via messages transmitted via Radio MCU 300.

We claim:

1. A wireless radio modem comprising:
a Radio Microcontroller (MCU) deriving its power from a Power Conditioning Circuit, which is in turn powered by an external Power Supply, wherein the MCU creates an internal schedule of radio network events; a Precision Timebase, which derives its time synchronization from an External Timebase, wherein the Precision Timebase sends a signal to the MCU, which synchronizes the internal schedule of radio network events; a Load Switch, which powers an External Load, wherein the External Load is also synchronized to the internal schedule of network events; a Light Emitting Diode (LED) bank, wherein the LED bank signify various activities or states of the radio network events; an External Device Bus, which facilitates data sharing with external devices and sensors; and an External Antenna which is interfaced via a Radio Frequency (RF) Matching Network, RF Switch and Amplifier Network, and an Antenna and Connector Network, in order to transmit data to other Radio Modems according to the internal schedule of radio events; wherein said wireless Radio Modem maintains its own internal time base by synchronizing its Precision Time Base to Universal Coordinated Time (UTC); wherein the universally synchronized internal time base guarantees synchronization of radio network parameters and message scheduling without in-band radio message transmissions; wherein said synchronized radio network parameters are comprised of a hopping pattern and a message timing; wherein both the hopping pattern and the message timing of its Frequency Hopping (FH) and Time Division Multiple Access (TDMA) radio scheme are synchronized to the UTC in a pseudo-random and deterministic manner; and wherein the synchronization and the message scheduling are augmented by individual wireless Radio Modems with privately known encryption keys and Universally Unique Identifiers (UUIDs).

2. The wireless radio modem of claim 1, further comprising an ability to communicate with other identical or dissimilar electronic devices to monitor parameters, provide data, or control functionality.

3. The wireless modem of claim 2, further comprising the ability to enter extended periods of extreme low power operation through a utilization of a schedule controlled by the precision time base.

4. The wireless modem of claim 3, further comprising the ability to utilize the precision time base as a basis for sequencing modulation schemes utilizing one or more frequencies, concurrently with its use for low power operation.

5. The wireless modem of claim 3, further comprising the ability to calibrate the precision time base based upon data from internal circuitry or external interfaces.

6. The wireless modem of claim 2, further comprising the ability to provide diagnostic information, including transmission signal strength or message activity in order to assist users in installing and maintaining a robust network of said radio modems.

7. The wireless modem of claim 5, further comprising the ability to synchronize its precision time base with the external time base in order to gain concurrent synchronization of multiple identical, similar, or disparate systems.

8. The wireless modem of claim 5, further comprising the ability to deterministically alter its frequency and time slot usage based upon information provided via external interfaces.

9. The wireless modem of claim 8, further comprising the ability to use universally available information, including date and time in order to alter said frequency and time slot usage.

* * * * *